United States Patent
Zhao et al.

(10) Patent No.: US 9,301,269 B1
(45) Date of Patent: Mar. 29, 2016

(54) ACQUISITION OF PERIODIC SYNCHRONIZATION SIGNALS

(71) Applicant: Marvell International Ltd., Hamilton (BM)

(72) Inventors: Qing Zhao, Milpitas, CA (US); Chusong Xiao, Union City, CA (US); Manyuan Shen, Milpitas, CA (US); Hui-Ling Lou, Sunnyvale, CA (US); Leilei Song, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 177 days.

(21) Appl. No.: 14/018,135

(22) Filed: Sep. 4, 2013

Related U.S. Application Data

(60) Provisional application No. 61/702,441, filed on Sep. 18, 2012.

(51) Int. Cl.
   *H04W 56/00*     (2009.01)
   *H04L 27/26*     (2006.01)
   *H04J 11/00*     (2006.01)

(52) U.S. Cl.
   CPC .......... *H04W 56/001* (2013.01); *H04J 11/0073* (2013.01); *H04L 27/2655* (2013.01)

(58) Field of Classification Search
   None
   See application file for complete search history.

(56) References Cited

U.S. PATENT DOCUMENTS

| | | | |
|---|---|---|---|
| 2006/0165041 A1* | 7/2006 | Song et al. | 370/335 |
| 2007/0133390 A1 | 6/2007 | Luo et al. | |
| 2007/0230591 A1* | 10/2007 | Choi | H04L 27/2657 375/260 |
| 2009/0036113 A1* | 2/2009 | Litwin et al. | 455/422.1 |
| 2009/0046671 A1* | 2/2009 | Luo | 370/336 |
| 2010/0041338 A1* | 2/2010 | Hannagan | H04L 27/2657 455/62 |
| 2010/0182979 A1 | 7/2010 | Malladi et al. | |
| 2013/0083877 A1* | 4/2013 | Gorokhov | 375/354 |
| 2013/0122822 A1 | 5/2013 | Srinivasan et al. | |

OTHER PUBLICATIONS

Srinivasan et al. (U.S. Appl. No. 61/558,377).*

* cited by examiner

*Primary Examiner* — Yemane Mesfin
*Assistant Examiner* — Peter Chen

(57) ABSTRACT

The present disclosure describes systems and techniques relating to wireless communications. According to an aspect of the described systems and techniques, an apparatus includes: circuitry configured to receive wireless communication transmissions having periodic synchronization signals transmitted at a fixed interval, wherein the periodic synchronization signals convey information used to establish communication between wireless communication devices; and circuitry configured to acquire the periodic synchronization signals of the wireless communication transmissions by, at least in part, (i) calculating objective function values for hypotheses of parameter sets for a current period, (ii) combining only a portion of the calculated objective function values with stored objective function value data from a prior period to form combined data used in signal acquisition, and (iii) storing the combined data or the portion of the calculated objective function values for use in a next period.

18 Claims, 5 Drawing Sheets

ACQUISITION OF PERIODIC SYNCHRONIZATION SIGNALS

CROSS REFERENCE TO RELATED APPLICATIONS

This application claims the benefit of the priority of U.S. Provisional Application Ser. No. 61/702,441, filed Sep. 18, 2012 and entitled "ACQUISITION OF PERIODIC SYNCHRONIZATION SIGNALS", which is hereby incorporated by reference in its entirety.

BACKGROUND

The present disclosure describes systems and techniques relating to wireless communications.

Wireless communication devices can use one or more wireless communication technologies such as orthogonal frequency division multiplexing (OFDM) or code division multiple access (CDMA). In an OFDM based wireless communication system, a data stream is split into multiple data substreams. Such data substreams are sent over different OFDM subcarriers, which can be referred to as tones or frequency tones. Various examples of wireless communication devices include mobile phones, smart phones, wireless routers, wireless hubs, base stations, and access points. In some cases, wireless communication electronics are integrated with data processing equipment such as laptops, personal digital assistants, and computers.

Wireless communication systems can include many base stations to provide effective coverage for wireless devices in the area. As the wireless devices move through the network, or are powered off and on, the wireless devices may need to establish a communication with an appropriate base station. To assist in this process, the base stations can generate synchronization signals with known codes and transmit these synchronization signals so that the wireless devices can perform detection and timing acquisition. For example, in a cellular network, a wireless device, often referred to as user equipment (UE), can acquire periodic synchronization signals transmitted by a base station, such as an evolved Node B (eNB), by observing signal samples within a single known time period and repeatedly restarting such observation until a synchronization signal is detected.

SUMMARY

The present disclosure describes systems and techniques relating to wireless communications. According to an aspect of the described systems and techniques, an apparatus includes: circuitry configured to receive wireless communication transmissions having periodic synchronization signals transmitted at a fixed interval, wherein the periodic synchronization signals convey information used to establish communication between wireless communication devices; and circuitry configured to acquire the periodic synchronization signals of the wireless communication transmissions by, at least in part, (i) calculating objective function values for hypotheses of parameter sets for a current period, (ii) combining only a portion of the calculated objective function values with stored objective function value data from a prior period to form combined data used in signal acquisition, and (iii) storing the combined data or the portion of the calculated objective function values for use in a next period.

The wireless communication transmissions can include additional synchronization signals different from the periodic synchronization signals, and the wireless communication transmissions can include non-synchronization signals at a frequency location different than that of the synchronization signals. The combining can include combining a value of an objective function with a same hypothesis of parameter set across more than two periods of the fixed interval. In addition, the combining can include adaptive-weight combining.

The calculating can include calculating the objective function values for the current period for only a subset of all possible hypotheses of parameter sets. Calculating only the subset of all possible hypotheses of parameter sets can include calculating an objective function for less than all available time instances, calculating an objective function for less than all available carrier frequencies, or both. The circuitry configured to acquire the periodic synchronization signals can be configured to select the portion of the calculated objective function values for combination. The circuitry configured to acquire the periodic synchronization signals can be configured to store local objective function optima in a small time and/or frequency interval for use in objective function combining. Moreover, the circuitry configured to acquire the periodic synchronization signals can be configured to combine selected hypotheses from the current period with stored hypothesis data from the prior period.

According to another aspect of the described systems and techniques, a method includes: receiving, at a wireless communication device, wireless communication transmissions having periodic synchronization signals transmitted at a fixed interval, wherein the periodic synchronization signals convey information used to establish communication between wireless communication devices; and acquiring the periodic synchronization signals of the wireless communication transmissions, the acquiring including calculating objective function values for hypotheses of parameter sets for a current period, combining only a portion of the calculated objective function values with stored objective function value data from a prior period to form combined data used in signal acquisition, and storing the combined data or the portion of the calculated objective function values for use in a next period.

The wireless communication transmissions can include additional synchronization signals different from the periodic synchronization signals, and the wireless communication transmissions can include non-synchronization signals at a frequency location different than that of the synchronization signals. The combining can include combining a value of an objective function with a same hypothesis of parameter set across more than two periods of the fixed interval. The combining can include adaptive-weight combining.

The calculating can include calculating the objective function values for the current period for only a subset of all possible hypotheses of parameter sets. Calculating only the subset of all possible hypotheses of parameter sets can include calculating an objective function for less than all available time instances, calculating an objective function for less than all available carrier frequencies, or both. The acquiring can include selecting the portion of the calculated objective function values for combination. The selecting can include storing local objective function optima in a small time and/or frequency interval for use in objective function combining. Moreover, the acquiring can include combining selected hypotheses from the current period with stored hypothesis data from the prior period The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable hardware processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The described systems and techniques can result in improved acquisition of synchronization signals in wireless networks. The acquisition of periodic synchronization signals can be made more robust than normal data reception. By exploring received signals in more than one period, less favorable signal-to-noise ratios (SNRs) can be accommodated during acquisition of the sync signal, while also providing reliable performance. This can help to eliminate signal acquisition as a bottleneck of communications. As a result, the probability of misdetection can be significantly reduced, and data throughput can be largely improved.

Details of one or more implementations are set forth in the accompanying drawings and the description below. Other features and advantages may be apparent from the description and drawings, and from the claims.

DRAWING DESCRIPTIONS

DETAILED DESCRIPTION

Figure 1A:
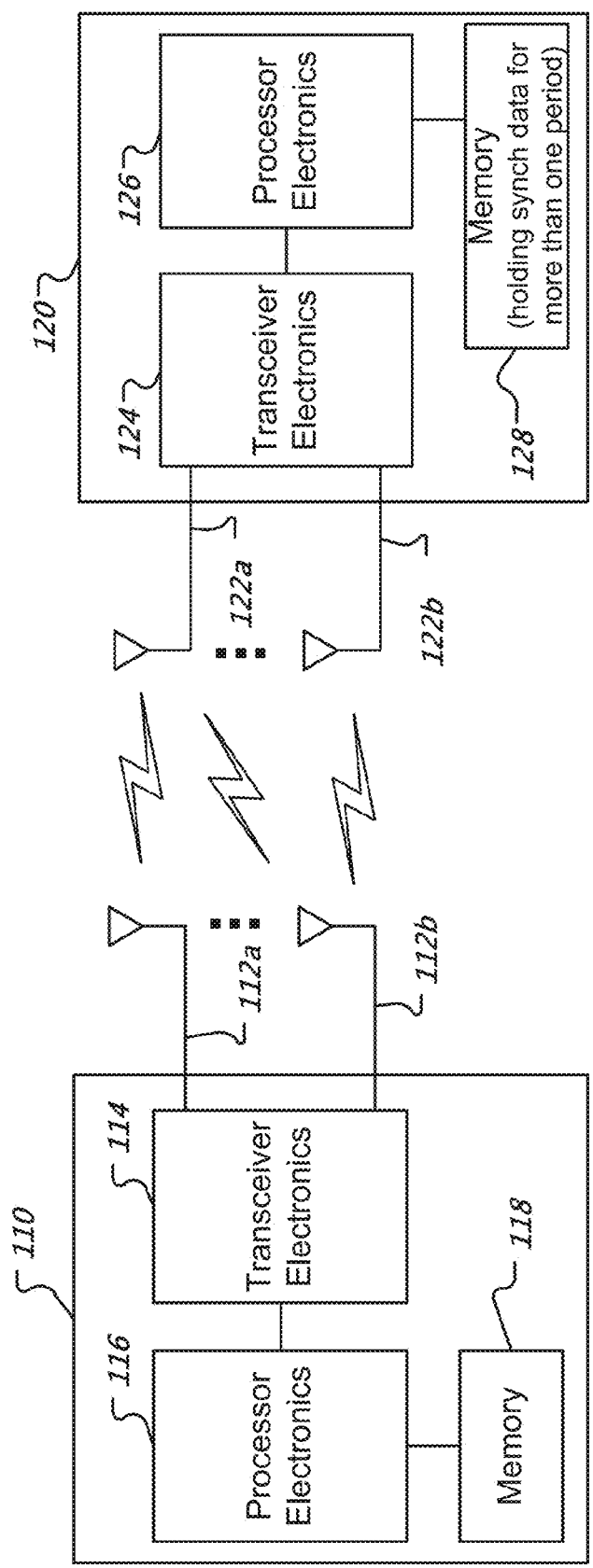
FIG. 1A shows an example of a wireless network with two wireless communication devices, including a receiver device having additional memory storing synchronization data.

FIG. 1A shows an example of a wireless network with two wireless communication devices, including a receiver device (wireless communication device 120) having additional memory storing synchronization data. Wireless communication devices 110 and 120, such as an access point (AP), base station (BS), access terminal (AT), client station, or mobile station (MS) can include processor electronics 116 and 126, such as one or more hardware processors that implement the systems and techniques presented in this disclosure. Wireless communication devices 110, 120 include transceiver electronics 114 and 124 to send and/or receive wireless signals over one or more antennas 112a, 112b, 122a, and 122b. In some implementations, transceiver electronics 114, 124 include multiple radio units. In some implementations, a radio unit includes a baseband unit (BBU) and a radio frequency unit (RFU) to transmit and receive signals. Wireless communication devices 110, 120 can also include one or more memories 118 and 128 configured to store information such as data and/or instructions. In some implementations, wireless communication devices 110, 120 include dedicated circuitry for transmitting and dedicated circuitry for receiving.

A first wireless communication device 110 can transmit data over multiple wireless channels to a second wireless communication device 120. In some implementations, the first wireless communication device 110 implements a frequency division technique to transmit data to the second wireless communication device 120 using two or more wireless channels operated at different frequency bands. In some implementations, the first wireless communication device 110 implements a time division technique to transmit data to the second wireless communication device 120 using separate time slots into a shared frequency band. In some implementations, the first wireless communication device 110 implements a space division technique to transmit data to the second wireless communication device 120 using two or more multiplexing matrices to provide spatially separated wireless channels in a single frequency band.

Wireless communication devices 110, 120 in a wireless network, e.g., a wireless local area network (WLAN), can use one or more protocols for Medium Access Control (MAC) and Physical (PHY) layers. For example, a wireless communication device can use a Carrier Sense Multiple Access (CSMA) with Collision Avoidance (CA) based protocol for a MAC layer and OFDM for the PHY layer. The wireless communication devices 110, 120 can be configured for one or more wireless communication techniques such as single-input single-output (SISO), multi-input multi-output (MIMO), bit-level combining, and symbol-level combining. A MIMO-based wireless communication device can transmit and receive multiple spatial streams over multiple antennas in each of the tones of an OFDM signal.

The wireless communication devices 110, 120 are sometimes referred to as transmitters and receivers for convenience. For example, a "transmitter" as used herein refers to a wireless communication device that receives and transmits signals. Likewise, a "receiver" as used herein refers to a wireless communication device that receives and transmits signals. However, in the following description, the focus will be on the device 110 being a transmitter (e.g., a base station), and the device 120 being a receiver (e.g., a UE).

Synchronization signals refer to the signals that carry the fundamental system information required to establish communication connections. Such signals are often transmitted by base stations in wireless networks, such as WCDMA (Wideband Code Division Multiple Access), CDMA2000, WiMAX (Worldwide Interoperability for Microwave Access), and LTE (Long-Term Evolution, often referred to as 4G, which employs OFDM technology). Synchronization signals can provide timing information (e.g., when transmission starts), identity information (e.g., who transmits the signals), carrier information (e.g., what carrier frequency is used for transmission), or a combination of such information. Before wireless commination is established, the receiver (e.g., wireless communication device 120) should be able to detect these synchronization signals in order to determine the system information needed to establish communication connections.

Many synchronization signals are periodic in that the synchronization signals are transmitted periodically with a fixed and known interval. A wireless communication device 120 can detect such periodic synchronization signals, using the systems and techniques described herein, in part by using its memory 128 to hold synchronization data for more than one period. This synchronization data can be the actual samples of monitored radio frequency (RF) signals received during the acquisition of the synchronization signals, other data derived therefrom, or a combination of both. In any case, storing and processing such data for more than one period of the fixed and known interval can require additional memory and processing resources for the device 120, but the amount of such extra resources can be limited using the systems and techniques described further below.

As will be appreciated, these described systems and techniques can be implemented in one or more devices (e.g., a wireless communication device, an electronic data storage device, a channel medium access access/control device). Such devices can include transceiver electronics 124 and processor electronics 126, which can include one or more integrated circuit (IC) devices. For example, the systems and techniques disclosed can be implemented in a WLAN transceiver device (e.g., a WLAN chipset) suitable for use in an OFDM MIMO system. Furthermore, the systems and techniques disclosed are applicable to general cellular and wireless network systems that employ periodic synchronization signals.

Figure 1B:
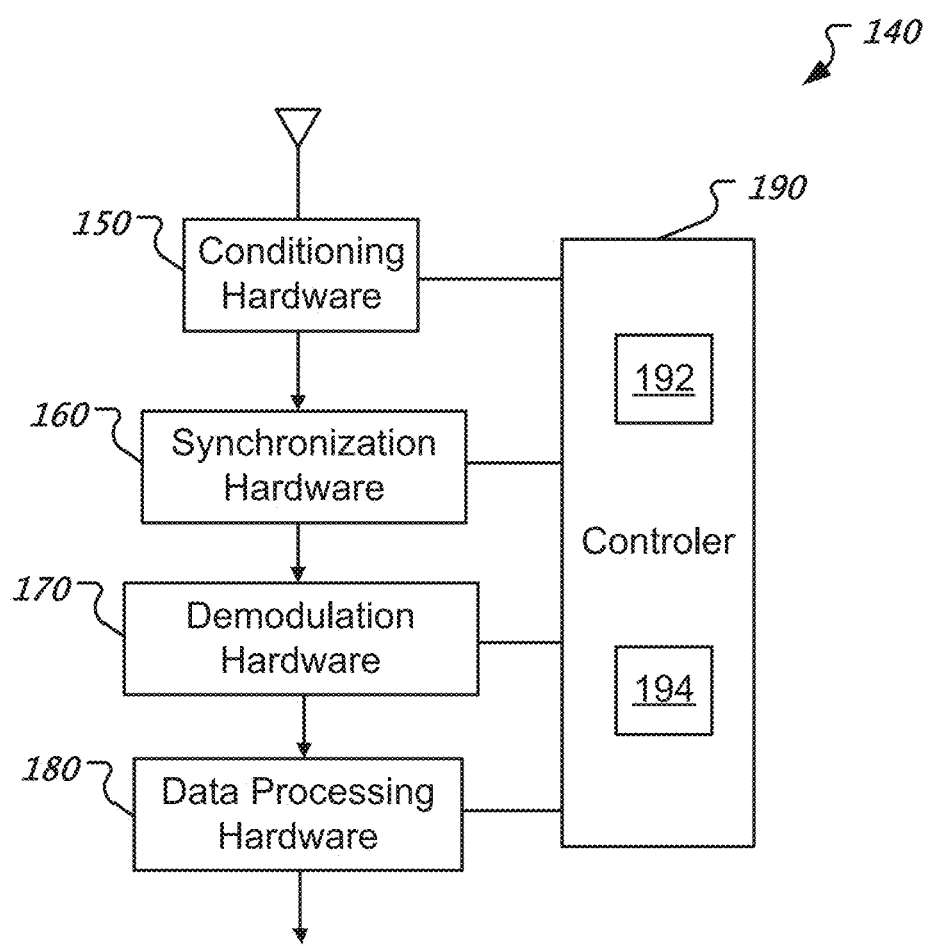
FIG. 1B shows an example of processing hardware for user equipment in a wireless communication network.

FIG. 1B shows an example of processing hardware 140 for user equipment in a wireless communication network. An antenna is connected with conditioning hardware 150, which can include one or more of each of the following: filters, amplifiers, frequency downconverters, and analog-to-digital converters. Synchronization hardware 160 receives samples of a conditioned wireless signal at a sample rate, which may be at the chip rate or higher in various implementations.

The synchronization hardware 160 performs synchronization based on the input samples and provides detected base station signal information (e.g., base station identities and timing). Demodulation hardware 170 processes the input samples based on the information provided by the synchronization hardware 160 and provides symbol estimates. Data processing hardware 180 processes the symbol estimates and provides decoded data.

One or more of the conditioning hardware 150, the synchronization hardware 160, the demodulation hardware 170, and/or the data processing hardware 180 can be connected with one or more controllers 190, which orchestrate the activities of processing hardware 140. In some implementations, a controller 190 includes one or more processing units 192 and embedded program code 194 (e.g., firmware) that effects such orchestration, including the activity of the synchronization hardware 160.

In some implementations, the synchronization hardware 160 and the controller 190 constitute circuitry configured to acquire periodic synchronization signals of wireless communication transmissions using the systems and techniques described herein. In general, synchronization signal acquisition can be represented by the following mathematical model:

$$\Theta_{opt} = \arg\max_{\Theta} f(\Theta, r(t)), \quad t \in [t_0, t_0 + T], \quad (1)$$

where r(t) is any piece of received signal in $[t_0, t_0+T]$, $t_0$ is the start of acquisition, and T is the signal length for acquisition (e.g., $T_P$=the known period of sync signals); $\Theta$ is any hypothesis of a parameter set for sync signal acquisition, including hypothesis of sync signal start, carrier frequency, identity, etc.; $f(\Theta, r(t))$ is the objective function, which is maximized when the optimal parameter set is selected (or minimized by properly designing the objective function); and $\Theta_{opt}$ is the selected parameter set, carrying all detected sync information. Acquisition is a process to calculate the value of the objective function for all possible hypothesis parameter sets and find the one that optimizes the objective function.

The synchronization hardware 160 observes multiple periods, but rather than simply using RF signals in only one period to acquire synchronization signals (and discarding the RF signals and intermediate results after failure in the current period), the synchronization hardware 160 retains synchronization data (e.g., RF signal samples and intermediate results) for use in the next period. For example, a value of an objective function with a same hypothesis of parameter set can be combined across more than two periods of a fixed interval. Expressed mathematically:

$$\Theta_{opt} = \qquad (2)$$
$$\arg\max_{\Theta} f(\Theta, r(t)) \oplus f(\Theta, r(t+T_P)) \oplus \ldots \oplus f(\Theta, r(t+(N-1)T_P)),$$
$$t \in [t_0, t_0 + T_P]$$

where N is the number of periods for sync signal acquisition, and $\oplus$ is a combining operator referring to a process filtering that operates across multiple periods. By utilizing signals in multiple periods for acquisition of sync signals, the repetition features of synchronization signals can be fully explored.

In order to explore sync signals in multiple periods, the value of the objective function with the same hypothesis of parameter set in each period should be effectively combined to improve the performance. While this can require storing the observation values of the objective function for more than one period, which adds to system memory requirements, this can be offset by the use of techniques that reduce memory requirements, such as described further below. In addition, since the channel is changing and a good course estimate of the frequency may not be available at the time of sync signal acquisition, the combining (e.g., averaging) should be performed carefully to avoid loss of performance, as discussed further below.

Figure 2A:
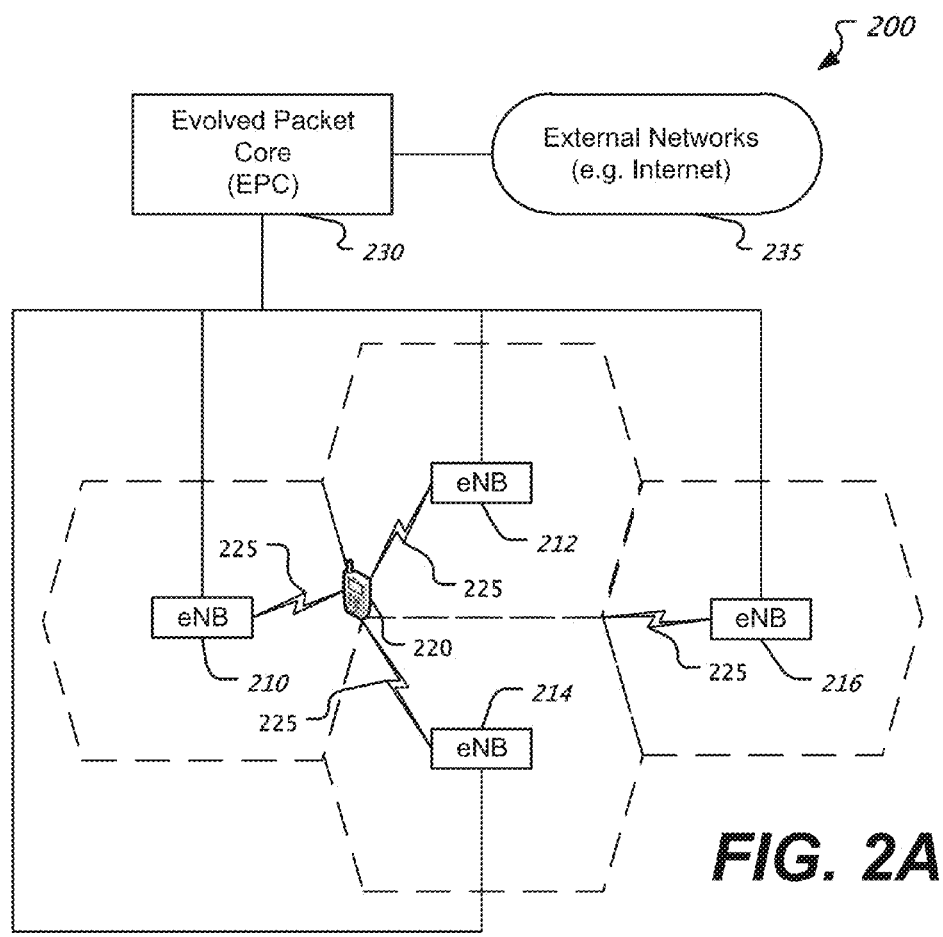
FIG. 2A shows an example of a wireless communication system.

FIG. 2A shows an example of a wireless communication system 200. In this example, the wireless communication system 200 is based on the 3GPP LTE standard, although it will be appreciated that the present disclosure is not limited to the LTE environment. In some implementations, the wireless communication system 200 can include multiple radio access technologies such as WCDMA (Wideband Code Division Multiple Access), UMTS (Universal Mobile Telecommunications System), CDMA2000, and GSM (Global System for Mobile communications).

The wireless communication system 200 can include one or more cellular networks made up of a number of radio cells, or cells that are each served by a base station, such as evolved Node B (eNB) base stations 210, 212, 214, and 216. The cells are used to cover different areas in order to provide radio coverage over a wide area. Wireless communication devices operated in the cellular radio coverage areas that are served by the base stations, such as device 220, can be referred to as user equipment (UE). The wireless communication system 200 shown in FIG. 2A includes four base stations 210, 212, 214, 216 (other numbers of base stations are possible) included in a radio access network (RAN) that is known as an evolved UMTS Terrestrial Radio Access Network (eUTRAN). In the LTE example of FIG. 2A, the base stations are shown as eNB base stations 210, 212, 214, 216. The eUTRAN includes the eNB base stations 210, 212, 214, 216.

A base station 210 can operate in a mobile environment such as a femto-cell, pico-cell, or the base station 210 can operate as a node that can relay signals for other mobile and/or base stations. Base stations 210, 212, 214, 216 can provide wireless services to one or more wireless communication devices 220. Base stations 210, 212, 214, 216 can communicate with each other and with a core network called an evolved packet core (EPC) 230. The EPC 230 can provide wireless communication devices with access to one or more external networks 235, such as the Internet. The EPC 230 can include a mobility management entity (MME). The MME can be the main control element in the EPC 230 responsible for the functionalities, such as the control plane functions related to subscriber and session management.

The eNB base stations 210, 212, 214, 216 communicate directly with the UE 220. The UE 220 can be a cellular phone, personal digital assistant (PDA), smartphone, laptop, tablet computer, or other wireless communications device. Further, UEs 220 can include pagers, portable computers, Session Initiation Protocol (SIP) phones, one or more hardware-based processors within devices, or any other suitable processing devices capable of communicating information using a radio technology. UE 220 can communicate directly with a serving base station to receive service when UE 220 is operated within the cell associated with the corresponding serving station. UE 220 can also receive radio signals from base stations neighboring the serving base station. Once a wireless connection is established, the UE 220 generates requests and responses, or otherwise communicates with the EPC 230 and the external network 235 via one or more eNB base stations 210, 212, 214, 216.

Before a wireless connection can be established, the UE 220 should detect the presence of the base stations 210, 212, 214, 216. Each base station 210, 212, 214, 216 sends out one or more corresponding synchronization signals 225, which may be detected by the UE 220, depending on distance, channel conditions, and the processing activity of the UE 220. As shown in FIG. 2A, the UE 220 is too far from eNB 216 to detect its synchronization signal(s) 225, but the UE 220 can detect the synchronization signal(s) 225 from eNB 210 and 212, and may also detect the synchronization signal(s) 225 from eNB 214.

The UE 220 receives RF signals across many frequencies, where these RF signals include periodic sync signals, and the UE 220 attempts to acquire the periodic sync signals. Acquisition of periodic sync signals refers to (but is not limited to) detection of when sync signals are transmitted, what type of sync signals are transmitted, and what carrier frequency is used for transmission. Successful acquisition by the UE 220 can provide the following information (but not limited to) frame boundary, which can be derived from the time location of sync signals, carrier frequency, which can be derived from the frequency location of sync signals, and identity information, which can be derived from time/frequency location or the sequence/type of sync signals. As noted above, acquisition of a periodic sync signal is an important step in building and maintaining reliable communication between two devices, such as for network entry and mobility control in cellular systems. Also note that different types of period synchronization signals 225 can be used in the system 200, and these different periodic synchronization signals 225 can come from different base stations (e.g., different sync signals representing the identity of the base station) or from the same base station (e.g., one base station transmitting multiple sync signals in different locations that carry different information).

Figure 2B:
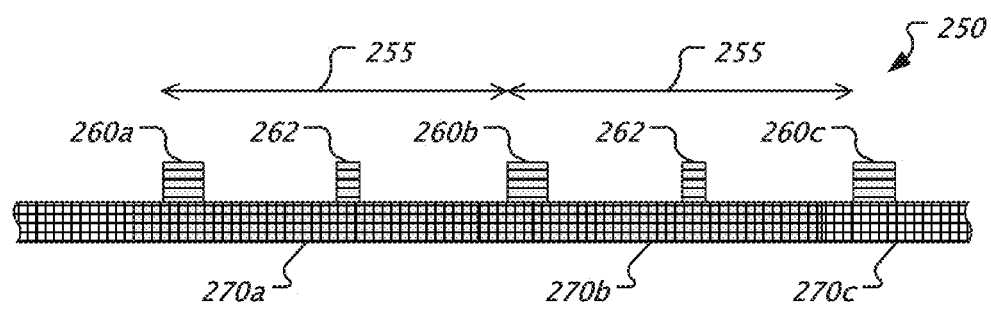
FIG. 2B shows an example of wireless communication transmissions from a base station.

FIG. 2B shows an example of wireless communication transmissions 250 from a base station. The wireless communication transmissions 250 include periodic synchronization signals 260a, 260b, and 260c, along with corresponding non-synchronization signals 270a, 270b, and 270c. The beginning of each periodic synchronization signal 260a, 260b, 260c is separated from the next by the fixed and known interval 255. In addition, in the example shown, the non-synchronization signals 270a, 270b, 270c provide the data frames transmitted at a frequency location different from that of the synchronization signals 260a, 260b, 260c. Although this example describes such an overlay mode, where different carrier frequencies are used for the synchronization signals and the non-synchronization signals, other implementations include those where both types of signals share a common carrier frequency.

The periodic synchronization signals 260a, 260b, 260c, and/or the non-synchronization signals 270a, 270b, 270c, can be non-contiguous in time and/or frequency in one period (e.g., not all of the non-synchronization signal 270a need be present, as shown). The periodic synchronization signals 260a, 260b, 260c can be transmitted with other signals at the same frequency and/or time allocations. The periodic synchronization signals 260a, 260b, 260c can be transmitted in any time/frequency locations in a period 255. In general, the length(s) of the synchronization signals are no longer than the transmission period 255, and the position of a synchronization signal with respect to a data frame can be set as desired.

In addition, the synchronization signals in a period 255 need not be exactly the same. For example, different synchronization signals 262 can also be transmitted. In LTE implementations, network interface device (NID) 1 signals are primary sync signals, and NID 2 signals are secondary sync signals. NID 2 signals are transmitted every five milliseconds, but for two adjacent five milliseconds, the secondary sync signals are different. Nonetheless, the same type of sync signal is repeated every 10 milliseconds, and the present systems and techniques can be employed for such periodic synchronization signals in LTE environments.

Figure 3A:
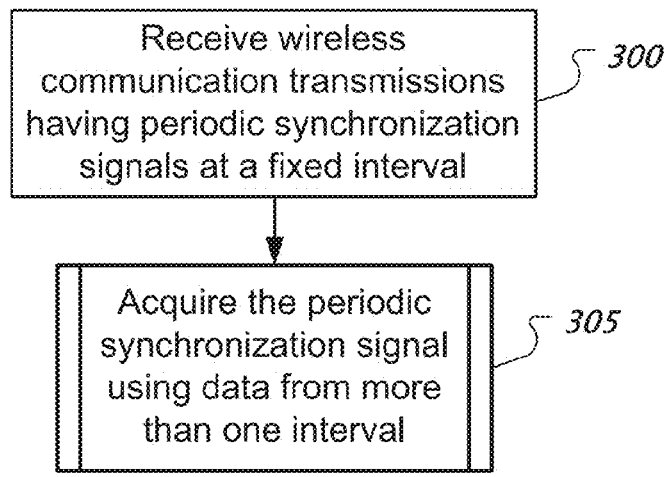
FIGS. 3A-3C are flowcharts showing examples of processes for acquiring periodic synchronization signals in wireless communication transmissions.

FIG. 3A is a flowchart showing a process for acquiring periodic synchronization signals in wireless communication transmissions. At 300, wireless communication transmissions having periodic synchronization signals transmitted at a fixed interval are received at a wireless communication device. The periodic synchronization signals convey information used to establish communication between wireless communication devices, such as described above. At 305, the receiving wireless communication device acquires the periodic synchronization signals of the wireless communication transmissions using data from more than one interval. This process of acquisition can be accomplished in various manners, as described in further detail below. In general though, the complexity of the process of acquisition should be reduced, such as by reducing the computation complexity, reducing the memory requirements, or both.

Figure 3B:
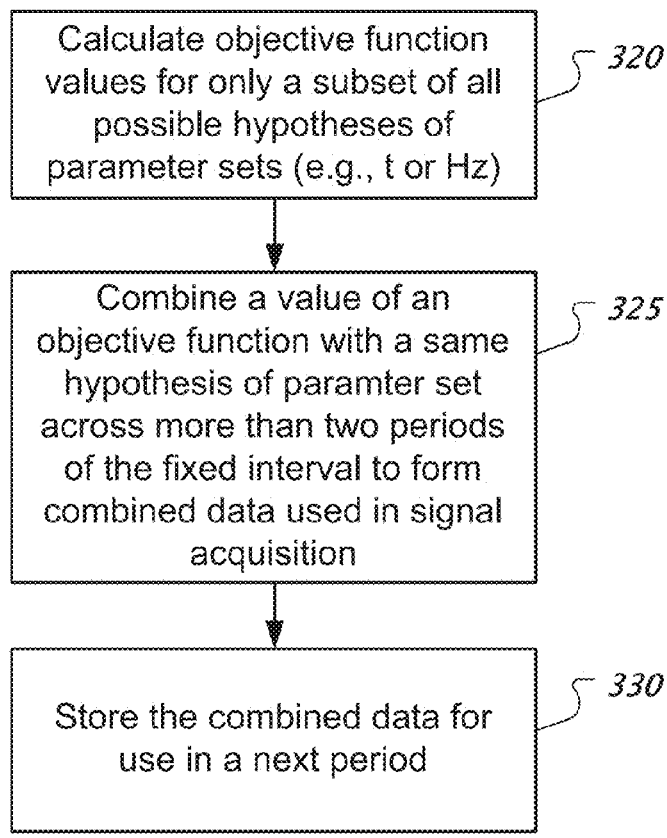

FIG. 3B is a flowchart showing an example of a process for acquiring periodic synchronization signals in wireless communication transmissions. At 320, objective function values for only a subset of all possible hypotheses of parameter sets can be calculated for a current period. For example, the objective function can be calculated for every few time instances (i.e., less than all available time instances; e.g., every 10 time instances). As another example, the objective function can be calculated for every few carrier frequencies (i.e., less than all available carrier frequencies; e.g., every 25 Hz). Note that other examples are possible, and these various example reductions in computational complexity can be combined together. In general, by calculating objective function values for only a subset of all possible hypotheses of parameter sets, the computational complexity is reduced.

At 325, a value of an objective function can be combined with a same hypothesis of parameter set across more than two periods of the fixed interval. While the general case of the present disclosure is broad enough to include using only the current period and one prior period, there may be advantages to using more than two periods. The combining is essentially a filtering process to suppress the noise/interference and to combat fading effects. As such, there may be advantages to providing varying amounts of influence to past periods in the combining, where the varying amounts can be fixed by period position relative to the current period, or the varying amounts can be set by determinations made regarding the nature of the channel over time.

For example, the combining can be implemented as (but need not be limited to) MRC (maximum ratio combining)-like combining, EGC (equal gain combining)-like combining, fixed-weight combining, or adaptive-weight combining. In an MRC-like combining, the signal strength can be estimated for each period, and the weights for each period can be set proportional to the assessed signal strength. In an EGC-like combining, the same gain applied weight can be used. In fixed-weight combining, different weights or the same weights can be used for each respective observation period. In adaptive-weight combining, the weights for each respective observation period are adaptively changed based on the signal strength, the channel conditions, and the current frequency set residues.

At 330, the combined data can be stored for use in a next period. The original values and intermediate results can be stored and retained for a set number of periods or until a synchronization signal is acquired. In general, the amount of memory used should be minimized, while still retaining sufficient additional synchronization data over more than one period to improve synchronization signal acquisition. To reduce the memory requirements, only a portion of the calculated objective function values need be combined.

Figure 3C:
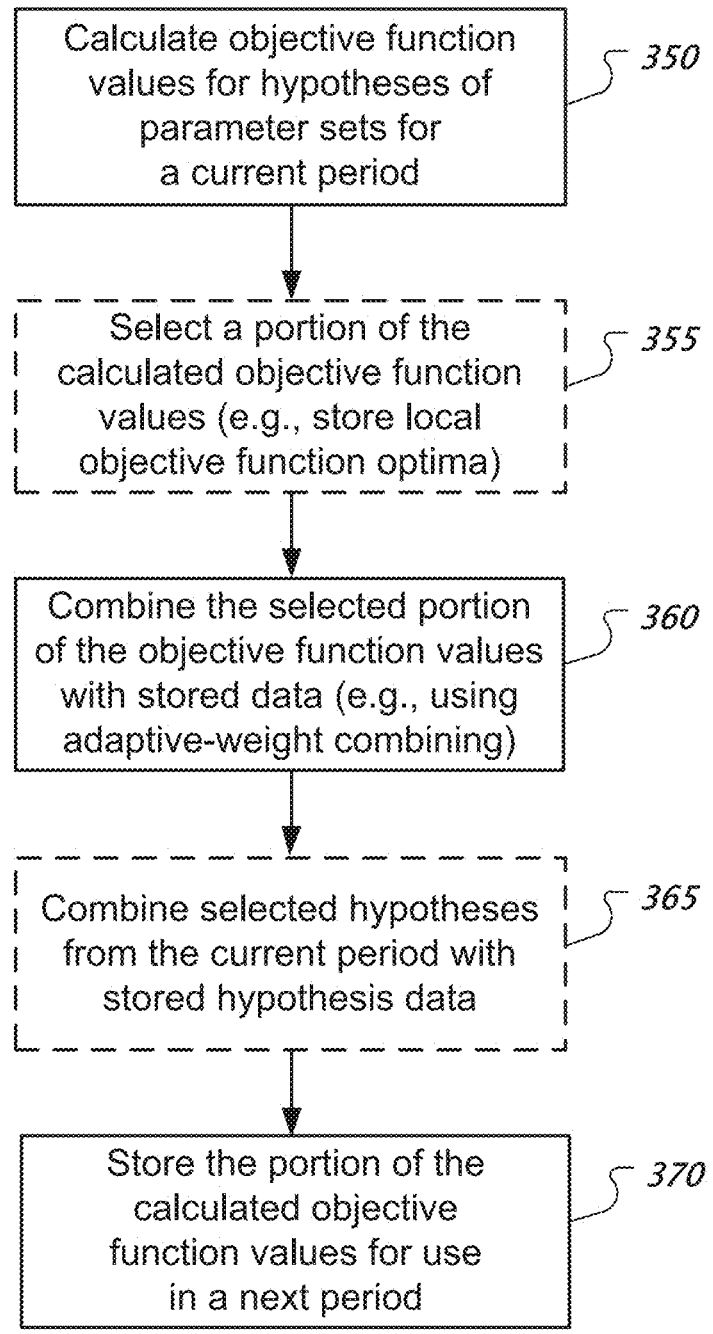

FIG. 3C is a flowchart showing another example of a process for acquiring periodic synchronization signals in wireless communication transmissions. At 350, objective function values for hypotheses of parameter sets can be calculated for a current period. This can include calculating all possible hypotheses of parameter sets, or calculating only a subset of all possible hypotheses of parameter sets, as described above in connection with FIG. 3B. In addition, when the objective function values are calculated, it will often be readily apparent which hypotheses are clearly not close to being the best, and these can be discarded.

At 355, in some implementations, a portion of the calculated objective function values can be selected for combination. Various criteria can be used in different implementations for making this selection. In some implementation, the selecting can include storing local objective function optima in a small time and/or frequency interval for use in objective function combining. For example, in a given period, the objective function can be calculated for each time instance, and the best four hypotheses in respective four parts of the given period can be identified and stored for combining.

At 360, only the selected portion of the calculated objective function values are combined with stored objective function value data from a prior period to form combined data used in signal acquisition. This combining can involve using the combining techniques discussed above in connection with FIG. 3B (e.g., the combining can be adaptive-weight combining). In addition, the combining can be done for the local objective function optima in a small time and/or frequency interval. For example, when the best four hypotheses in the respective four parts of the current period are identified, the corresponding calculated objective function values can be combined with the stored objective function values corresponding to the best four hypotheses in the respective four parts of the last period, which may or may not correspond to the same time instances in the two periods.

At 365, in some implementations, combining can also be performed on selected hypotheses from the current period and stored hypothesis data from the prior period. Combining on the selected hypotheses of a given interval in each period can be used to further improve the performance. For example, when the objective function values for the best four hypotheses in the current period are combined with the best four hypotheses in the last period, the corresponding hypotheses themselves can be combined. Note that since the time instances may not correspond in the two periods, the combination of the hypotheses should take this into account. For example, the different time instances can be averaged together to generate a new time instance, such as by using a pure average or using a weighted average that takes the corresponding objective function values into account.

At 370, the portion of the calculated objective function values can be stored for use in a next period. In addition, the corresponding hypotheses can also be stored. In the four parts example given above, the four objective function values and the corresponding four hypotheses are stored for use in the next period. Note that the four parts are in the current period, and in some implementations, certain smaller time periods (e.g., symbol timing period in OFDM signals) can be divided into such parts, and the best objective function value can be picked in each part in time and then be combined with similar parts in a next period. Using parts and a subset in such fashions can result reduced hardware costs in some implementations.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An apparatus comprising:
   first circuitry configured to receive wireless communication transmissions having periodic synchronization signals transmitted at a fixed interval, wherein the periodic synchronization signals convey information used to establish communication between wireless communication devices; and
   second circuitry configured to acquire the periodic synchronization signals of the wireless communication transmissions by, at least in part, (i) calculating objective function values for hypotheses of parameter sets for a current period, (ii) combining only a portion of the calculated objective function values with stored objective function value data from a prior period to form combined data used in sync signal acquisition, and (iii) storing the combined data or the portion of the calculated objective function values for use in a next period, wherein the acquisition of the sync signal is used to establish a wireless communication with a source of the wireless communication transmissions;
   wherein the combining comprises combining a value of an objective function with a same hypothesis of parameter set across more than two periods of the fixed interval.

2. The apparatus of claim 1, wherein the wireless communication transmissions include additional synchronization signals different from the periodic synchronization signals, and the wireless communication transmissions include non-synchronization signals at a frequency location different than that of the synchronization signals.

3. The apparatus of claim 1, wherein the combining comprises adaptive-weight combining.

4. The apparatus of claim 1, wherein the calculating comprises calculating the objective function values for the current period for only a subset of all possible hypotheses of parameter sets.

5. The apparatus of claim 4, wherein calculating only the subset of all possible hypotheses of parameter sets comprises calculating an objective function for less than all available time instances.

6. The apparatus of claim 4, wherein calculating only the subset of all possible hypotheses of parameter sets comprises calculating an objective function for less than all available carrier frequencies.

7. The apparatus of claim 1, wherein the second circuitry configured to acquire the periodic synchronization signals is configured to select the portion of the calculated objective function values for combination.

8. The apparatus of claim 7, wherein the second circuitry configured to acquire the periodic synchronization signals is configured to store local objective function optima in a small time and/or frequency interval for use in objective function combining.

9. The apparatus of claim 7, wherein the second circuitry configured to acquire the periodic synchronization signals is configured to combine selected hypotheses from the current period with stored hypothesis data from the prior period.

10. A method comprising:
    receiving, at a wireless communication device, wireless communication transmissions having periodic synchronization signals transmitted at a fixed interval, wherein the periodic synchronization signals convey information used to establish communication between wireless communication devices; and
    acquiring the periodic synchronization signals of the wireless communication transmissions, the acquiring comprising
    calculating objective function values for hypotheses of parameter sets for a current period,
    combining only a portion of the calculated objective function values with stored objective function value data from a prior period to form combined data used in sync signal acquisition, and
    storing the combined data or the portion of the calculated objective function values for use in a next period;
    wherein the acquisition of the sync signal is used to establish a wireless communication with a source of the wireless communication transmissions; and
    wherein the combining comprises combining a value of an objective function with a same hypothesis of parameter set across more than two periods of the fixed interval.

11. The method of claim 10, wherein the wireless communication transmissions include additional synchronization signals different from the periodic synchronization signals, and the wireless communication transmissions include non-synchronization signals at a frequency location different than that of the synchronization signals.

12. The method of claim 10, wherein the combining comprises adaptive-weight combining.

13. The method of claim 10, wherein the calculating comprises calculating the objective function values for the current period for only a subset of all possible hypotheses of parameter sets.

14. The method of claim 13, wherein calculating only the subset of all possible hypotheses of parameter sets comprises calculating an objective function for less than all available time instances.

15. The method of claim 13, wherein calculating only the subset of all possible hypotheses of parameter sets comprises calculating an objective function for less than all available carrier frequencies.

16. The method of claim 10, wherein the acquiring comprises selecting the portion of the calculated objective function values for combination.

17. The method of claim 16, wherein the selecting comprises storing local objective function optima in a small time and/or frequency interval for use in objective function combining.

18. The method of claim 16, wherein the acquiring comprises combining selected hypotheses from the current period with stored hypothesis data from the prior period.

* * * * *